Feb. 4, 1969  G. D. JACOBS  3,425,624
TRACTION DEVICE
Filed May 8, 1967
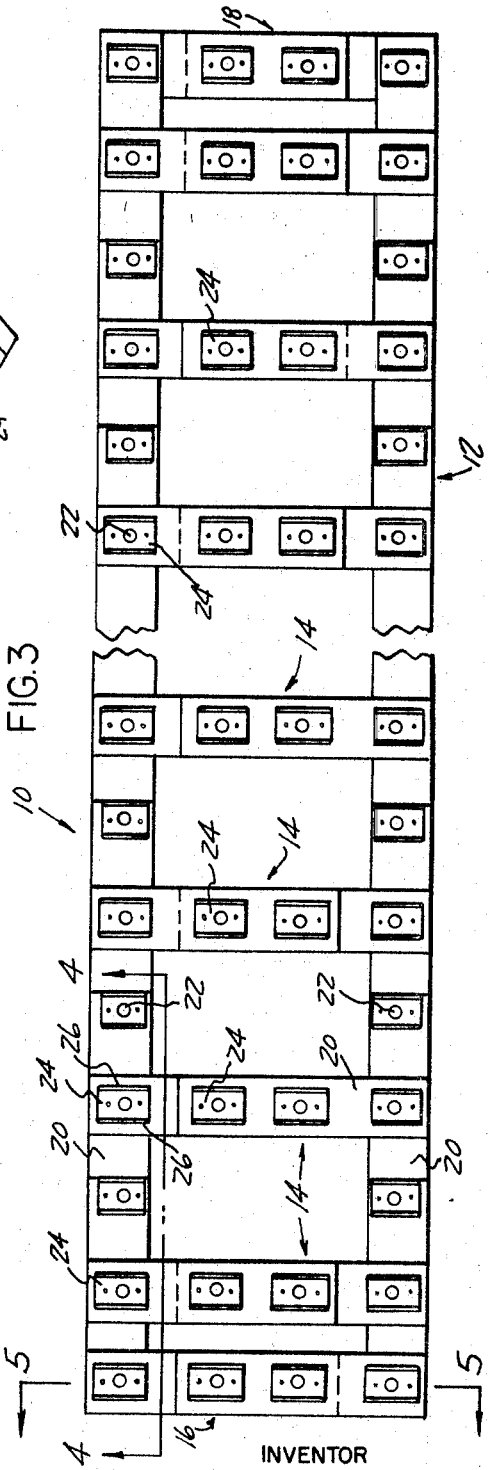
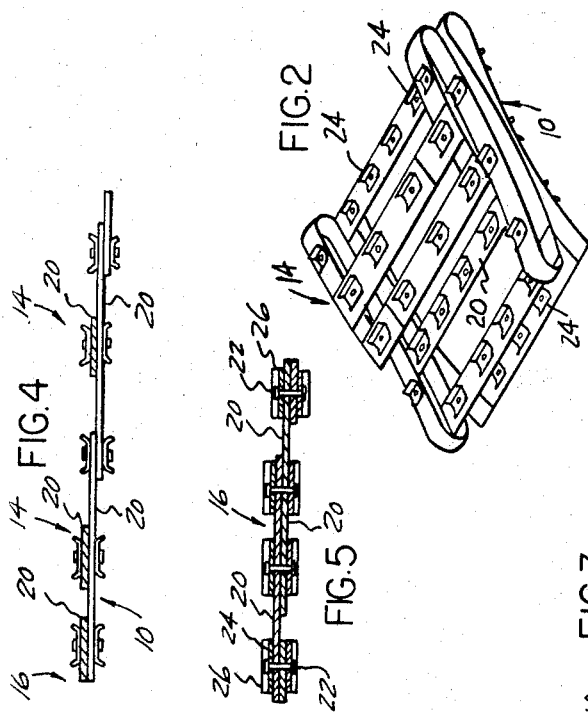
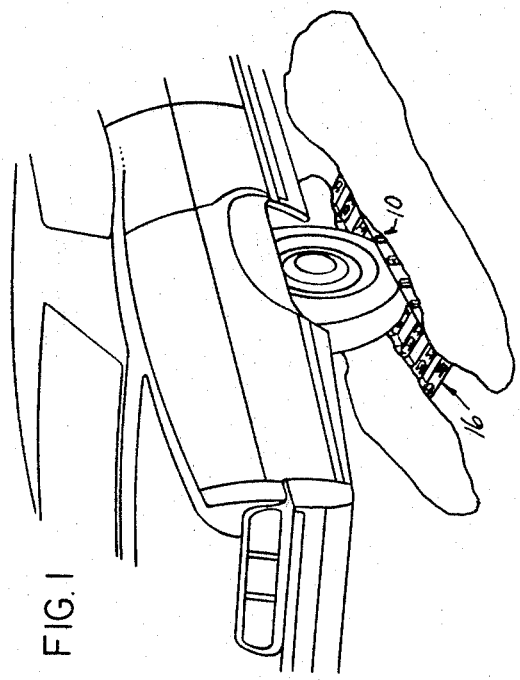
INVENTOR
GUS D. JACOBS
BY *Hauke, Krass, & Gifford*
ATTORNEYS 3,425,624
TRACTION DEVICE
Gus D. Jacobs, 12750 Lincoln, Huntington
Woods, Mich. 48070
Filed May 8, 1967, Ser. No. 636,902
U.S. Cl. 238—14                          8 Claims
Int. Cl. E01b 23/00; B62d 55/08

ABSTRACT OF THE DISCLOSURE

A device for insertion between the wheel of a vehicle and the roadway, to provide traction, consists of a pair of flexible elongated strips joined in a parallel relationship by a plurality of shorter, regularly spaced, transversely extending strips, in a ladder-like arrangement. Both the parallel strips and the transverse connecting sections are formed of flat, shorter overlapping sections. A plurality of metal cleats are spaced along both surfaces of the parallel strips and the connecting sections, at points where the short elements overlap. The spacing between the parallel strips is approximately equal to the tread width of the tire the device is to be used with and the spacing between adjacent transverse strips is slightly less than that distance.

BACKGROUND OF THE INVENTION

Field of the invention

This invention relates to an elongated flexible traction member which may be inserted between the wheel of a vehicle and the supporting roadway in order to increase the traction or frictional engagement between the two to allow the vehicle to move in situations where the wheels have been slipping.

Description of the prior art

It has been previously proposed to provide elongated traction devices for insertion between the wheel of a vehicle and the roadway, which are adapted to engage both the wheel and the roadway with a high degree of frictional and mechanical engagement so as to allow the vehicle to move with respect to the roadway. These devices are used by disposing them with either their forward edge adjacent to the rearmost point of contact between a powered wheel of the vehicle and the roadway, with the member extending rearwardly from this point of contact, parallel to the potential direction of motion of the vehicle, or in a similar position adjacent to the forward point of contact. When the wheel is powered, any slight motion will wedge traction devices between the wheel and the road.

Summary of the present invention

The present invention contemplates a traction device of this class which is formed in a ladder-like configuration consisting of a pair of elongated parallel flexible strips joined to one another at regular intervals by shorter normally extending flexible strips. In the following description the elongated parallel strips will be termed the "longitudinal members" and the shorter transverse connecting strips the "rungs." In the preferred embodiment of the invention both the longitudinal members and the rungs are formed of relatively short strips of fabric reinforced rubber joined to one another by fasteners which connect at overlapping ends of the strips. Typically each rung will be formed by a pair of overlapping strips and the longitudinal members will contain a number of overlapping strips equal in number to the rungs. Each fastener which retains the overlapping edges of a pair of strips also retains a pair of generally U-shaped cleats, one on each side of the combined section thus formed. The cleats are disposed with their edges projecting outwardly and they comprise the primary traction members.

The separation of the two longitudinal strips approximates the width of a tire on which the traction device is to be used so that when the device is supported between a tire and the ground, the side longitudinal members will tend to be upwardly inclined with respect to the horizontal rungs, so as to engage the sidewalls of the tire. Since the tire will normally be supported in a rut, the cleats on the outer edges of the longitudinal strips will tend to engage the sides of the ruts. This will prevent the wheels from digging a deeper rut and will increase the traction between the device and the supporting surface.

The overlapping of the short sections which make up the strips and rungs allows the device to have relatively thin edges so that it may be easily inserted between a wheel and its supporting surface. It also gives the entire unit a high degree of flexibility so that it will accommodate the contour of both the tire and the surrounding supporting surface. Additionally, it provides a sufficient thickness and strength at the cleat position to provide a firm foundation between the wheel and the rut.

Other objects, advantages and applications of the present invention will be made apparent by the following detailed description of the preferred embodiment of the invention. The description makes reference to the accompanying drawings in which:

FIGURE 1 is a perspective view of a preferred embodiment of the invention in use under the right, rear wheel of an automobile;

FIGURE 2 is a perspective view of a preferred embodiment of the present invention;

FIGURE 3 is a plan view thereof;

FIGURE 4 is a sectional view transversely through a plurality of rungs taken along line 4—4 of FIGURE 3; and FIGURE 5 is a sectional view taken longitudinally through one of the rungs along line 5—5 of FIGURE 3.

Referring to the drawings, the embodiment of the invention disclosed consists of a ladder-like member employing two longitudinal members, generally indicated at 10 and 12, joined in spaced parallel relation by a number of rungs, generally indicated at 14 which extend normally between the two longitudinal members 10 and 12 and overlap them at their ends. With the exception of the two end rungs, generally indicated at 16 and 18, the rungs 14 are evenly spaced with respect to one another by a distance which is dependent on the general size of the tire with which they are to be used, but which is normally slightly less than the spacing between the longitudinal members 10 and 12. The end rungs 16 and 18 are disposed adjacent the extreme ends of the longitudinal members 10 and 12 and have their centers displaced from the next adjacent rungs 14 by about half the distance that exists between the centers of the other adjacent rungs.

As is best seen in FIGURES 4 and 5 both the longitudinal members 10 and 12 and the rungs 14, 16 and 18 are formed of shorter strips of heavy rubber with reinforcing treads extending along both its longitudinal and transverse dimensions. The short strips 20 may be made of the same material as tire carcasses, and I have manufactured a number of units from scrapped tires.

The strips 20 may all be formed of an equal length approximately equal to the distance between opposite edges of a pair of rungs 14. Since the distance between opposed edges of the longitudinal strips 10 and 12 is slightly greater than the distance between opposite sides of the rungs 14, a pair of short sections 20 will be required for each rung, and they will overlap one another at the center of the rung by a distance equal to about half the length of the rung. This provides the rungs with a sufficient thickness to become easily wedged between the wheel and the ground, but retains the necessary flexibility at the single sections.

As is best shown in FIGURE 3, the manner in which the two short sections forming a rung overlap is not of importance. The ends of the rungs 14, 16 and 18, which overlap the longitudinal strips 10 and 12, all overlap on the same side, to provide the unit with symmetry.

Along the longitudinal members 10 and 12 an overlap between sections 20 occurs halfway between each rung. The ends of the strips 20 are joined together at their overlaps by rivets 22. A pair of rivets each overlap the two sections 20 which form one of the rungs 14. Otherwise a single rivet 22 accomplishes the fastening of the overlapped ends.

Each rivet 22 also retains a pair of cleats 24 to the structure, one on each side of the joinder, so that the rivets sandwich the joined sections between them. The cleats consist of rectangular sheets of steel with side edges turned up as at 26. These cleats are formed of relatively heavy steel such as 20 gauge. The cleats are aligned on the structure so that their upturned edges 26 extend parallel to the longitudinal axis of the rungs. Accordingly, four cleats are aligned along each rung; one at each overlap with the longitudinal members 10 and 12, and two on the overlap of the strips 20 which form each rung. Also, a single cleat is disposed on each section of the longitudinal members 10 and 12 between a pair of rungs.

Accordingly, the cleats are all disposed on the unit at sections of double thickness, which constitutes effectively the operating thickness of the unit. However, the connections between each rung section and the longitudinal members, and the connections between adjacent cleats on the longitudinal sections, are formed of single thickness sections, providing the unit with the necessary degree of flexibility.

In use, a pair of units are preferably disposed with one end adjacent to either the rear or forward edge of each of the driving wheels of the vehicle. The wheels are then powered so as to bring the tire into contact with the cleats formed on the end rungs 16 or 18. Since the rungs 14 immediately adjacent to these end rungs 16 and 18 are disposed but a short distance away, any further rotation of the vehicle wheel will bring it into contact with these rungs. Simultaneously, the rungs on the bottom side of the traction position are being forced into the ground. The longitudinal members adacent to the end contacted by the tire are forced up the sides into contact with the tire, and the cleats on the reverse side may also be forced into the rut, depending upon its configuration.

The spacing between adjacent rungs 14 is chosen so as to be close enough so that the tire cannot maintain a weight bearing engagement with the supporting surface, between such rungs. This is generally slightly less than the spacing between the longitudinal strips 10 and 12.

Having thus described my invention, I claim:

1. A traction device for providing an engagement between a powered wheel of a vehicle and a supporting surface, comprising:
    (a) a pair of elongated, flexible, spaced, parallel longitudinal strips;
    (b) a plurality of cleats disposed along both sides of the longitudinal strips;
    (c) a plurality of flexible, rung strips, each having a shorter length than the longitudinal strips and fastened at their ends to the longitudinal strips to retain them in parallel relationship to one another;
    (d) a plurality of rigid cleats fastened on both sides of each rung, the cleats on each side being generally arranged in a row between the longitudinal strips with surfaces extending anglarly with respect to their rung surfaces so that when the device is disposed between a powered wheel and a supporting surface both the longitudinal strips and the rung strips supporting the cleats can flex to accommodate the shape of the wheel and the surface supporting the wheel.

2. The traction device of claim 1 wherein the cleats are formed of rectangular sheets of metal and have a pair of opposed edges bent angularly with respect to intermediate planar sections, along the entire length of such edges.

3. The traction device of claim 1 wherein both the longitudinal strips and their rungs are formed of shorter sections of a flexible material which overlap one another at their joinder to form first sections of a single thickness and other sections of a double thickness, and are joined together by fasteners.

4. The traction device of claim 3 wherein each of the fasteners also retains a pair of cleats with their planar sections in parallel engagement with opposite sides of the section thus formed.

5. The traction device of claim 3 wherein each rung is formed of a pair of shorter sections, each of said shorter sections having one end fixed to one of the longitudinal strips, and the other ends of the shorter sections overlap something less than the total distance between the pair of longitudinal strips.

6. The traction device of claim 5 wherein two fasteners join each overlapping inner section of the pair of shorter sections which form each rung and a pair of cleats are secured to the rung by each fastener, one cleat being supported on each side of the rung.

7. The traction device of claim 5 wherein the rungs are separated from one another by a lesser distance than the longitudinal strips are separated from one another.

8. A traction device for providing engagement between a powered wheel of a vehicle and a supporting surface, comprising:
    (a) a pair of elongated, flexible, parallel longitudinal members, each formed of a continuous series of shorter strips of a flexible material which overlap one another to form first sections of a single thickness and other sections of a double thickness, each of said series being joined together by fasteners at the sections of double thickness;
    (b) a plurality of rung strips, each formed of a pair of shorter rung sections of a flexible material, each having an inner end overlapping one another to form first rung sections of a single thickness and other rung sections of a double thickness, each pair of said shorter rung sections being joined together by fasteners at the sections of double thickness, and the outer end of each rung section overlapping sections of single thickness of the longitudinal members to form still further sections of double thickness joined together by fasteners; and
    (c) a plurality of cleats, each formed of rectangular sheets of metal with a pair of opposed edges bent angularly with respect to a planar intermediate section, disposed on both sides of the longitudinal members and connected thereto by the fasteners only at sections of double thickness, and on both sides of the rung strips and connected thereto by the fasteners only at the rung sections of double thickness, the cleats which are fastened to the rung strips being disposed in a row transverse to the longitudinal members so that cleats in each row are movable toward and away from ane another as the rung strips are flexed.

References Cited

UNITED STATES PATENTS

| | | | |
|---|---|---|---|
| 2,248,537 | 7/1941 | Libbey | 238—14 |
| 2,707,658 | 5/1955 | Grenier | 305—35 |
| 2,739,017 | 3/1956 | Arps | 305—35 |
| 2,891,822 | 6/1959 | McCormick | 305—35 |
| 3,202,358 | 8/1965 | Griswold | 238—14 |
| 3,350,013 | 10/1967 | Bergquist | 238—14 |

ARTHUR L. LA POINT, *Primary Examiner.*

RICHARD A. BERTSCH, *Assistant Examiner.*

U.S. Cl. X.R.

305—35